United States Patent [19]

Kemp

[11] Patent Number: 4,717,704

[45] Date of Patent: Jan. 5, 1988

[54] HYDROTREATING CATALYSTS PREPARED FROM HYDROGELS

[75] Inventor: Richard A. Kemp, Stafford, Tex.

[73] Assignee: Shell Oil Company, Houston, Tex.

[21] Appl. No.: 924,221

[22] Filed: Oct. 28, 1986

[51] Int. Cl.$^4$ .............. B01J 27/19; B01J 27/188; B01J 27/185; C10G 45/08

[52] U.S. Cl. .............. 502/211; 208/216 R; 208/254 H; 502/210; 502/213

[58] Field of Search .............. 502/211, 210, 213; 423/628

[56] References Cited

U.S. PATENT DOCUMENTS

| | | | |
|---|---|---|---|
| 2,894,900 | 7/1959 | Hemminger | 502/217 |
| 3,124,418 | 3/1964 | Malley et al. | 23/143 |
| 3,520,654 | 7/1970 | Carr et al. | 23/143 |
| 3,798,176 | 3/1974 | Ao | 502/210 |
| 3,864,461 | 2/1975 | Miller et al. | 423/628 |
| 3,879,310 | 4/1975 | Rigge et al. | 252/435 |
| 3,897,365 | 7/1975 | Feins | 502/211 |
| 3,969,273 | 7/1976 | Brown et al. | 252/435 |
| 4,066,572 | 1/1978 | Choca | 252/437 |
| 4,154,812 | 5/1979 | Sanchez et al. | 423/626 |
| 4,202,798 | 5/1980 | Johnson et al. | 252/437 |
| 4,588,706 | 5/1986 | Kukes et al. | 502/210 |
| 4,624,938 | 11/1986 | Kemp | 502/20 F |
| 4,629,716 | 12/1986 | Kemp | 502/20 F |

*Primary Examiner*—Paul E. Konopka
*Attorney, Agent, or Firm*—Pamela J. McCollough

[57] ABSTRACT

This invention relates to a process for preparing highly active hydrotreating catalysts prepared by incorporating cobalt and an element selected from the group consisting of molybdenum, tungsten and mixtures thereof, into a phosphated alumina hydrogel support. The final calcined catalysts have surface areas greater than about 300 m$^2$/g, flat plate crush strengths greater than about 18 lbs and more than about 80% of their pore volume in pores having diameters less than about 70 Å.

86 Claims, No Drawings

HYDROTREATING CATALYSTS PREPARED FROM HYDROGELS

FIELD OF THE INVENTION

This invention relates to a process for preparing highly active phosphated alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks of high metals content, the metals tend to deposit rapidly on the catalysts surface and plug the pores of conventional hydroprocessing catalysts, resulting in a loss of catalytic activity for sulfur and nitrogen removal. To facilitate the diffusion of large components into and out of the catalyst and to prevent surface deposits of coke and metals, large pore diameters are required. On the other hand, when processing feedstocks with no metals or with low metals contents, it may be technically and economically desirable to use narrow-pore catalysts.

Related cases include co-pending applications, Ser. No. 924,225, filed Oct. 28, 1986, Ser. No. 924,222, filed Oct. 28, 1986 and Ser. No. 924,097, filed Oct. 28, 1986, which are directed to catalysts prepared by the addition dry metal salts to hydrogels.

SUMMARY OF THE INVENTION

The present invention relates to a process for the preparation of hydrotreating catalysts containing cobalt and an element selected from the group consisting of molybdenum, tungsten and mixtures thereof, incorporated into an alumina/aluminum phosphate hydrogel-derived support. The catalyst is prepared by a process which comprises:

(a) titrating an aqueous solution of an acid aluminum salt and an aqueous solution of a basic aluminum compound in the presence of a phosphorus-containing compound, thereby forming a precipitate, (b) aging the precipitate at a temperature ranging from about 20° C. to about 90° C. for at least about 15 minutes at a pH ranging from about 8.0 to about 12.0, (c) washing the precipitate, (d) mixing the precipitate with water-soluble salts of cobalt and a heavy metal selected from the group consisting of molybdenum, tungsten and mixtures thereof, at a pH in the range between about 4.0 and about 8.0 and a temperature in the range between about 25° C. and about 100° C. until incorporation of the metal salts into the gel is sufficient to yield a final catalyst having from about 1% w to about 5% w cobalt and from about 8% w to about 30% w heavy metal, (e) extruding the product of step (d), and (f) drying and calcining the product of step (e) at a temperature ranging from about 300° C. to about 900° C.

It has been found that hydrogel-derived catalysts can be prepared using the hydrogel as a solvent in the reaction of the hydrogel with the metal salts. One of the benefits of adding no additional water when the metal salts are added to the hydrogel is that less metal is lost to the effluent during washing. In addition, the use of phosphorus-containing hydrogels gives catalysts having activities equal to or better than catalysts prepared by conventional impregnation techniques when compared on a volumetric basis while having densities significantly lower than conventionally prepared catalysts. Two of the major advantages of the hydrogel route are higher metals utilization and lower costs of catalyst manufacture. The catalysts prepared according to the invention have high surface areas, greater than about 300 m$^2$/g; high crush strengths, greater than about 18 lbs; and substantial portions, greater than about 80%, of their pores with diameters less than about 70 Å. These catalysts are particularly useful for hydrotreating applications.

DESCRIPTION OF THE PREFERRED EMBODIMENTS

In the process of the instant invention, a highly active hydrotreating catalyst is prepared by incorporating cobalt and an element selected from the group consisting of molybdenum, tungsten and mixtures thereof, into a phosphated alumina hydrogel-derived support prepared by titrating an aqueous solution of an acid aluminum compound and an aqueous solution of a basic aluminum compound in the presence of a phosphorus-containing compound.

The phosphated alumina hydrogel can be prepared by titrating an aqueous solution of one or more aluminum salt(s) with an appropriate acidic or basic material or solution in the presence of a phosphorus-containing compound to cause precipitation of the alumina gel. One skilled in the art will recognize that the alumina gel can be prepared by titrating an acidic aluminum salt such as, for example, aluminum sulfate, aluminum nitrate or aluminum chloride in aqueous solution with a basic precipitating medium such as, for example, sodium hydroxide or ammonium hydroxide in the presence of a phosphorus-containing compound or, by titrating an alkali metal aluminate such as, for example, sodium aluminate or potassium aluminate, in aqueous solution with an acidic precipitating medium such as, for example, hydrochloric acid or nitric acid, in the presence of a phosphorus-containing compound. One skilled in the art will recognize that the adjustment of the pH of an aluminum-containing solution to between about 5.5 and about 10.0 will result in precipitation of the aluminum as aluminum hydroxide or hydrated aluminum oxide.

In a preferred embodiment, the phosphated alumina hydrogel is prepared by titrating an aqueous solution of an alkali metal aluminate and an aqueous solution of acid aluminum salt in the presence of a phosphorus-containing compound, to cause precipitation of the phosphated alumina gel. Suitable acidic aluminum salts include aluminum sulfate, aluminum nitrate and aluminum chloride. A preferred species in aluminum chloride. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species, at least one of which has a phosphorus-containing compound dissolved therein, to cause precipitation of the hydrogel (referred to as "simultaneous precipitation").

As used herein, the term "a phosphorus-containing compound" is generic and refers to one phosphorus-containing compound as well as more than one phosphorus-containing compound. The phosphorus-containing compound is generally selected from the group consisting of phosphoric acid, a phosphate salt and mixtures thereof. Suitable phosphate salts include alkali metal phosphate, alkali metal hydrogen phosphate, ammonium phosphate and ammonium hydrogen phosphate. The phosphorus-containing compound is preferably phosphoric acid and is preferably mixed with the acid aluminum species prior to the precipitation. Alternatively, the phosphorus-containing compound can be sodium or ammonium phosphate and mixed with the basic aluminum species prior to precipitation. The phosphorus-containing compound can also be added as a separate solution or added to both the acid aluminum species and the basic aluminum species without significantly affecting the results. In a preferred embodiment, the phosphorus-containing compound is prepared using commercially available 85% phosphoric acid although other phosphorus-containing materials may be utilized. The amount of phosphorus-containing compound added to the acid aluminum species and/or the basic aluminum species is from about 0.06 to about 0.30 moles of phosphorus per mole of aluminum.

The temperature and pH of the precipitation are important variables in the preparation of the aluminas into which dry metal salts can be incorporated to form hydrotreating catalysts with desirable physical qualities. Changes in precipitation temperatures and pHs result in changes in porosities. In the instant invention, a precipitation temperature typically ranges from about 20° C. to about 90° C., preferably from about 50° C. to about 85° C., and a precipitation pH typically ranges between about 5.5 and about 10.0, preferably between about 5.5 and about 8.0, and more preferably between about 6.0 and about 7.5. The length of time required for the precipitation step is not critical. However, the maximum rate of addition of the acid aluminum species and the basic aluminum species is fixed by the rate at which the two streams can be mixed and the pH and temperature of the system can be effectively controlled.

After the precipitation step is completed, the pH of the slurry is adjusted by the addition of the basic aluminate solution to fall in the range from about 8.0 to about 12.0, preferably about 9.0 to about 11.0, most preferably about 9.5 to about 10.5, and aged at a temperature in the range from about 20° C. to about 90° C., preferably about 50° C. to about 85° C. for at least about 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the salts formed during the precipitation of the hydrogel which can be removed by washing. The preferred solvent for washing is water although other solvents such as lower alkanols may be utilized.

After washing, dry, water-soluble metal salts of cobalt and a heavy metal selected from the group consisting of molybdenum, tungsten and mixtures thereof, are added to the hydrogel and mixed until dissolution and adsorption of the metal salts onto the gel is essentailly complete. The metal salts of cobalt and molybdenum or tungsten are added to the hydrogel in amounts sufficient to incorporate into the final catalyst from about 1% w to about 5% w cobalt and from about 8% w to about 18% w molybdenum or about 10% w to about 32% w tungsten. When mixtures of molybdenum and tungsten are utilized, the final catalyst contains about 8% w to about 32% w molybdenum and/or tungsten.

Molybdenum is generally added to the hydrogel as a dry, water-soluble source of molybdenum such as ammonium heptamolybdate or ammonium dimolybdate. Tungsten is typically added to the hydrogel as ammonium metatungstate. Cobalt is added to the hydrogel in the form of dry, water-soluble cobalt nitrate, cobalt hydroxide, cobalt acetate, cobalt oxalate or cobalt oxide, with cobalt nitrate being preferred. In a preferred embodiment, a phosphorus-containing compound in an amount of phosphorus in the range from about 0.2 to about 1.5 moles of phosphorus per mole of molybdenum or tungsten is added directly to the hydrogel. Alternatively, the phosphorus-containing compound can be mixed with the dry cobalt salt prior to addition to the hydrogel. The phosphorus-containing compound is typically selected from the group consisting of phosphoric acid, a phosphate salt and mixtures thereof.

A preferred method of mixing the dry metal salts of cobalt and molybdenum and/or tungsten with the hydrogel consists of adding hydrogen peroxide to the mixture in an amount ranging from about 0.1 to about 1.0 mole of hydrogen peroxide per mole of molybdenum and/or tungsten. Optionally, a suitable amine compound such as monoethanolamine, propanolamine or ethylenediamine may be added to the mixture in order to aid in stabilization of the mixture.

The dry metal salts of cobalt and molybdenum and/or tungsten are typically added to the hydrogel in the form of finely divided particles which are generally 100 mesh or less in size. While particle size is not critical and larger particle sizes may be utilized, it is economically advantageous to use particles which are 100 mesh or less in size.

The temperature and pH of the mixing step are important variables in the preparation of hydrogel-derived catalysts which have acceptable densities and porosities. The temperature of the mixing step affects the catalysts only when phosphorus is added along with the dry metal salts with the trend being for higher temperatures to yield lower density catalysts. The pH of the mixing step, however, is critical to the formation of catalysts having the desired properties. Upper limits on the pH will be about 9.5, preferably about 9.0, more preferably about 8.5, and most preferably about 8.0, and lower limits on the pH will be about 4.0, preferably about 5.0 and more preferably about 4.5. The mixture of the hydrogel support with the dry metals salts is typically carried out at a pH in the range between about 4.0 and about 8.0, preferably between about 4.0 and about 6.0, adjusting to the pH ranges by adding, if necessary, acid or base to the hydrogel and/or the mixture of the hydrogel and the metal salts, and a temperature in the range between about 25° C. and about 100° C., preferably between about 25° C. and about 80° C., until adsorption of the metals salts onto the gel is sufficient to yield a final calcined catalyst having from about 1% w to about 5% w cobalt and from 8% w to about 18% w molybdenum or from about 10% w to about 32% w tungsten. Typically, the times for mixing the hydrogel and the dry metal salts will range from about 0.5 to about 2 hours.

Following the mixing step, the material may be extruded and then dried and calcined; dried, mulled with addition of water, extruded or pelleted and calcined; or partially dried, extruded or pelleted, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

In a preferred embodiment, the material is extruded and the dried. Alternatively, the material may be extruded after drying to the proper loss on ignition (LOI). However, to facilitate extrusion, organic binders and/or lubricants may be added prior to extrusion.

After drying, the material is calcined to produce the finished catalyst. The material may be calcined in any atmosphere, reducing, oxidizing or neutral, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of this invention. For example, prior to the complete drying of the catalyst, it may be extruded and then dried more completely, followed by calcination.

The final catalysts are found to have surface areas greater than about 300 m$^2$/g, pore volumes ranging from about 0.35 to about 1.2 cc/g and with at least 80% of its pore volume in pores having diameters less than about 70 Å. Flat plate crush strength are greater than about 18 lbs. In general, the metals contents of the final catalysts range from about 1% w to about 5% w cobalt, preferably from about 2.5% w to about 4% w cobalt, and from about 8% w to about 18% w, preferably about 10% w to about 14% w molybdenum or about 10% w, to about 32% w, preferably about 18% w to about 26% w tungsten.

The catalysts prepared in the instant invention can be suitably applied to hydrocarbon conversion processes such as catalytic cracking, hydrocracking, hydrotreating, isomerization, hydrogenation, disproportionation, dehydrogenation, oligomerization, alkylation, dealkylation and the like.

The catalysts of the instant invention are most commonly employed in reformer pretreating, distillate hydrotreating, and vacuum gas oil processing. Reaction temperatures will typically range from about 300° F. to about 850° F., preferably from about 500° F. to about 775° F. Reaction pressures are generally within the range of about 200 psig to about 2500 psig, preferably from about 600 psig to about 1500 psig. Reactions are conducted at liquid hourly space velocities within the range of about 0.1 to about 10 reciprocal hour.

Multiple uses of these feedstock after treating with the catalyst of this invention are possible. Depending on the particular feedstock treated, suitable uses can include finished products and conversion unit feedstocks.

The process for preparing the catalysts of the instant invention will be further described below by the following examples which are provided for illustration and which are not to be construed as limiting the invention.

EXAMPLE 1

Five hundred and eighty-three grams of reagent grade sodium aluminate were added to 787 grams of water which was then heated to 60° C. in order to effect dissolution of the materials. 271.5 grams of aluminum chloride hexahydrate were added to 380 grams of water. Fifty-six grams of 85% phosphoric acid along with 56 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. Both reagents were added in their entirety. After these quantities of reagents had been used, the final aging pH of the solution was adjusted to 10.0 using hydrochloric acid. The solution was aged for one hour at 60° C. The resulting material was filtered and washed in two large Buchner funnels with about 50 liters of water. The excess water from the wet filter cake was removed by vacuum. The hydrogel was then divided into two equal portions.

The following reagents were added directly to one portion of the hydrogel. 30.91 grams of cobalt nitrate as hexaydrate, 15.6 grams of 85% phasphoric acid. 50.04 grams of ammonium heptamolybdate, 14.8 grams of 30% hydrogen peroxide and 8.3 grams of monoethanolamine were mixed into the gel with vigorous stirring. The mixture was then stirred for two hour at a pH of 6.0 and a temperature of 25° C. At the end of two hours, the slurry was filtered and any excess water from the slurry was removed by vacuum. The wet gel was then extruded using a small, hand-held extruder using 0.156" cylindrical die, dried overnight at 120° C. and calcined in air at 510° C. The properties of the catalyst are listed in Tables I and II.

EXAMPLE 2

A catalyst was prepared according to Example 1 except that no phosphoric acid was added in the mixing step. The properties of the catalyst are in Tables I and II.

EXAMPLE 3

A catalyst was prepared according to Example 1 except that the pH in the mixing step was adjusted to 10.0 using ammonium hydroxide. The properties of the catalyst are listed in Tables I and II.

COMPARATIVE EXPERIMENT A

A catalyst was prepared according to Example 1 except that the pH in the mixing step was adjusted to 2.0 using aqueous hydrochloric acid. The materials prepared in this experiment were unsuitable for testing as the alumina support dissolved when the pH was adjusted to 2.0.

COMPARATIVE EXPERIMENT B

A catalyst was prepared using a conventional dry pore volume impregnation technique. A solution suitable for impregnating a gamma alumina carrier was prepared as follows. A first solution was made by adding 15.37 grams of cobalt nitrate and 9.67 grams of phosphoric acid to 5 milliliters of water which solution was then heated to 40° C. and stirred in order to effect dissolution of the materials. A second solution was prepared by mixing 4.0 milliliters of 30% hydrogen peroxide, 40 milliliters of distilled water and 23.39 grams of ammonium heptamolybdate. The mixture was then heated to 40° C. and stirred until all solids were dissolved. When both solutions were at or near ambient temperature, the second solution was slowly added to the first solution while stirring. After cooling and diluting with water to the total water pore volume of the support, the solution was added to the gamma alumina support in several small portions with intermediate agitations. The impregnated support was further agitated about 5 minutes, dried for 2 hours at 400° F. and calcined in air for 2 hours at 900° F. The properties of the catalyst are listed in Tables I and II.

CATALYST TESTING

Catalyst samples were used to hydrotreat a catalytically-cracked heavy gas oil (CCHGO) in a trickle-flow reactor. Ten ccs of the extruded catalyst were crushed and sieved to a 16–45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 650° C. and 850 psig $H_2$ with a $H_2$/oil equal to 4.0. Rate constants are reported relative to the impregnated catalyst (Example B). Measured rate constants include hydrogenation, denitrification and desulfurization. Specific catalyst performance characteristics are presented in Table III.

TABLE I

| Catalyst Properties | | | | |
|---|---|---|---|---|
| | EXAMPLE 1 | EXAMPLE 2 | EXAMPLE 3 | COMPARATIVE EXPERIMENT B |
| Aging pH[a] | 10.0 | 10.0 | 10.0 | — |
| Density g/cc[b] | 0.66 | 0.84 | 0.79 | 0.77 |
| Reslurry pH[c] | 6.0 | 6.5 | 10.0 | — |
| $N_2$ Surface Area $m^2/g$[d] | 418.0 | 404.0 | 374.0 | 190.0 |
| $N_2$ Pore Volume cc/g[e] | 0.61 | 0.38 | 0.40 | — |
| Flat Plate Crush Strength lbs.[f] | 19.0 | 18.0 | 13.0 | 16.0 |
| % wt. Cobalt[g] | 3.0 | 2.9 | 2.6 | 2.4 |
| % wt. Molybdenum[h] | 12.0 | 12.1 | 7.9 | 9.8 |
| % wt. Phosphorus[i] | 3.7 | 2.0 | 3.3 | 2.0 |

[a]Measured using an Orion 231 pH meter and Orion electrodes.
[b]209 cc volume fully settled in a graduated cup and weighed.
[c]Measured using an Orion 231 pH meter and Orion electrodes.
[d]BET, by nitrogen adsorption/desorption, Micromeritics Digisorb 2500 Instrument.
[e]By nitrogen adsorption, micromeritics Digisorb 2500 Instrument.
[f]Flat plate, single pellet, extrudate approximately 5 mm in length.
[g]Weight percent determined by neutron activation analysis or atomic absorption spectroscopy.
[h]Weight percent determined by neutron activation analysis or atomic absorption spectroscopy.
[i]Weight percent determined by neutron activation analysis or atomic absorption spectroscopy.

TABLE II

| Catalyst Pore Size Distributions | | | | |
|---|---|---|---|---|
| Hg Pore[j] Size Dist | EXAMPLE 1 | EXAMPLE 2 | EXAMPLE 3 | COMPARATIVE EXPERIMENT B |
| <50 ang | 70.3 | 84.9 | 86.5 | 2.9 |
| 50–70 ang | 16.7 | 3.5 | 3.9 | 14.9 |
| 70–100 ang | 3.9 | 2.8 | 2.6 | 40.1 |
| 100–150 ang | 3.2 | 2.7 | 2.7 | 35.9 |
| 150–350 ang | 3.5 | 2.8 | 3.1 | 4.1 |
| >350 ang | 2.4 | 3.3 | 1.2 | 2.0 |

[j] Determined by mercury intrusion, to 60,000 psi using a Micromeritics Autopore 9210, using a 130° contact angle and 0.473 N/m surface tension of mercury. Numbers listed are percent pore volume.

TABLE III

| Specific Catalyst Performance | | | |
|---|---|---|---|
| | CCHGO (VOLUMETRIC) | | |
| | H | N | S |
| Example 1 | 1.05 | 1.29 | 1.15 |
| Example 2 | 1.09 | 1.23 | 1.16 |
| Example 3 | 0.95 | 1.11 | 0.87 |
| Comparative Experiment B | 1.00 | 1.00 | 1.00 |

I claim as my invention:

1. A process for preparing highly active hydrotreating catalysts having surface areas above about 300 $m^2/g$ and at least about 80% of the pore volume in pores having diameters less than about 70 Å, which process comprises:
   (a) precipitating an aqueous solution of one or more aluminum salt(s) in the presence of a phosphorus-containing compound by adjusting the pH of said solution to a range between about 5.5 and about 10.0 at a temperature in the range between about 20° C. and about 90° C.,
   (b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salts of cobalt and a heavy metal selected from the group consisting of molybdenum, tungsten and mixtures thereof, at a pH in the range between about 4.0 and about 10.0 and a temperature in the range between about 25° C. and about 100° C. to yield a final catalyst having from about 1% w to about 5% w cobalt and from about 8% w to about 32% w heavy metal,
(e) extruding the product of step (d), and
(f) drying and calcining the product of step (e) at a temperature ranging from about 300° C. to about 900° C.

2. The process of claim 1 wherein the precipitation is carried out at a pH in the range between about 5.5 and about 8.0.

3. The process of claim 1 wherein the precipitation is carried out at a temperature between about 50° C. and about 85° C.

4. The process of claim 1 wherein the amount of phosphorus containing compound in step (a) is from about 0.06 to about 0.30 moles of phosphorus per mole of aluminum.

5. The process of claim 1 wherein the aging pH is in the range between about 9.0 and about 11.0.

6. The process of claim 1 wherein step (d) is carried out at a pH in the range between about 4.0 and about 6.0.

7. The process of claim 1 wherein said salt in step (d) are salts of cobalt and molybdenum.

8. The process of claim 7 wherein in step (d), a phosphorus-containing compound in an amount of from about 0.2 to about 1.5 moles of phosphorus per mole of molybdenum is added.

9. The process of claim 7 wherein said catalyst contains from about 2.5% w to about 4% w cobalt and from about 8% w to about 18% w molydbenum.

10. The process of claim 1 wherein in step (d), a phosphorus-containing compound in an amount of from about 0.2 to about 1.5 moles of phosphorus per mole of heavy metal is added.

11. A process for preparing highly active hydrotreating catalyst having surface areas above about 300 m$^2$/g and at least about 80% of the pore volume in pores having diameters less than about 70 Å, which process comprises:
(a) titrating an aqueous solution of an acid aluminum salt and an aqueous solution of a basic aluminum compound in the presence of a phosphorus-containing compound at a pH in the range between about 5.5 and about 10.0 and at a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salt of cobalt and a heavy metal selected from the group consisting of molybdenum, tungsten and mixtures thereof, at a pH in the range between about 4.0 and about 10.0 and a temperature in the range between about 25° C. and about 100° C. to yield a final catalyst having from about 1% w to about 5% w cobalt and from about 8% w to about 32% w heavy metal,
(e) extruding the product of step (d), and
(f) drying and calcining the product of step (e) at a temperature ranging from about 300° C. to about 900° C.

12. The process of claim 11 wherein the precipitation is carried out at a pH in the range between about 5.5 and about 8.0.

13. The process of claim 11 wherein the precipitation is carried out at a temperature between about 50° C. and about 85° C.

14. The process of claim 11 wherein the amount of phosphorus-containing compound in step (a) is from about 0.06 to about 0.30 moles of phosphorus per mole of aluminum.

15. The process of claim 11 wherein the aging pH is in the range between about 9.0 and about 11.0.

16. The process of claim 11 wherein step (d) is carried out at a pH in the range between about 4.0 and about 6.0.

17. The process of claim 11 wherein said salts in step (d) are salts of cobalt and molybdenum.

18. The process of claim 17 wherein in step (d), a phosphorus-containing compound in an amount of from about 0.2 to about 1.5 moles of phosphorus per mole of molybdenum is added.

19. The process of claim 17 wherein said catalyst contains from about 2.5% w to about 4% w cobalt and from about 8% w to about 18% w molybdenum.

20. The process of claim 11 wherein in step (d), a phosphorus-containing compound in an amount of from 0.2 to about 1.5 moles of phosphorus per mole of heavy metal is added.

21. A process for preparing highly active hydrotreating catalysts having surface areas above about 300 m$^2$/g and at least about 80% of the pore volume in pores having diameters less than about 70 Å, which process comprises:
(a) titrating an aqueous solution of an acid aluminum salt and phosphoric acid with an aqueous solution of a basic aluminum compound at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salts of cobalt and a heavy metal selected from the group consisting of molybdenum, tungsten and mixtures thereof, at a pH in the range between about 4.0 and about 10.0 and a temperature in the range between about 25° C. and about 100° C. to yield a final catalyst having from about 1% w to about 5% w cobalt and from about 8% w to about 32% w heavy metal,
(e) extruding the product of step (d), and
(f) drying and calcining the product of step (e) at a temperature ranging from about 300° C. to about 900° C.

22. The process of claim 21 wherein the precipitation is carried out at a pH in the range between about 5.5 and about 8.0.

23. The process of claim 21 wherein the precipitation is carried out at a temperature between about 50° C. and about 85° C.

24. The process of claim 21 wherein the amount of phosphoric acid in step (a) is from about 0.06 to about 0.30 moles of phosphorus per mole of aluminum.

25. The process of claim 21 wherein the aging pH is in the range between about 9.0 and about 11.0.

26. The process of claim 21 wherein step (d) is carried out at a pH in the range between about 4.0 and about 6.0.

27. The process of claim 21 wherein said salts in step (d) are salts of cobalt and molybdenum.

28. The process of claim 27 wherein in step (d), a phosphorus-containing compound in an amount of from about 0.2 to about 1.5 moles of phosphorus per mole of molybdenum is added.

29. The process of claim 27 wherein said catalyst contains from about 2.5% w to about 4% w cobalt and from about 8% w to about 18% w molybdenum.

30. The process of claim 21 wherein in step (d), a phosphorus-containing compound in an amount of from about 0.2 to about 1.5 moles of phosphorus per mole of heavy metal is added.

31. A process for preparing highly active hydrotreating catalysts having surface areas above about 300 $m^2/g$ and at least about 80% of the pore volume in pores having diameters less than about 70 Å, which process comprises:
  (a) titrating an aqueous solution of an acid aluminum salt with an aqueous solution of a basic aluminum compound and sodium phosphate at a pH in the range between about 5.5 and about 10.0 and a temperature in the range between about 20° C. and about 90° C., thereby forming a precipitate,
  (b) aging the precipitate at a temperature ranging from about 20° C. to about 90° C. for at least about 15 minutes at a pH ranging from about 8.0 to about 12.0,
  (c) washing the precipitate,
  (d) mixing the precipitate with dry, water-soluble salts of cobalt and a heavy metal selected from the group consisting of molybdenum, tungsten and mixtures thereof, at a pH in the range between about 4.0 and about 10.0 and a temperature in the range between about 25° C. and about 100° C. to yield a final catalyst having from about 1% w to about 5% w cobalt and from about 8% w to about 32% w heavy metal,
  (e) extruding the product of step (d), and
  (f) drying and calcining the product of step (e) at a temperature ranging from about 300° C. to about 900° C.

32. The process of claim 31 wherein the precipitation is carried out at a pH in the range between about 5.5 and about 8.0.

33. The process of claim 31 wherein the precipitation is carried out at a temperature between about 50° C. and about 85° C.

34. The process of claim 31 wherein the amount of sodium phosphate in step (a) is from about 0.06 to about 0.30 moles of phosphorus per mole of aluminum.

35. The process of claim 31 wherein the aging pH is in the range between about 9.0 and about 11.0.

36. The process of claim 31 wherein step (d) is carried out at a pH in the range between about 4.0 and about 6.0.

37. The process of claim 31 wherein said salts in step (d) are salts of cobalt and molybdenum.

38. The process of claim 37 wherein in step (d), a phosphorus-containing compound in an amount of from about 0.2 to about 1.5 moles of phosphorus per mole of molybdenum is added.

39. The process of claim 37 wherein said catalyst contains from about 2.5% w to about 4% w cobalt and from about 8% w to about 18% w molybdenum.

40. The process of claim 31 wherein in step (d), a phosphorus-containing compound in an amount of from about 0.2 to about 1.5 moles of phosphorus per mole of heavy metal is added.

41. A process for preparing highly active hydrotreating catalysts having surface areas above about 300 $m^2/g$ and at least about 80% of the pore volume in pores having diameters less than about 70 Å, which process comprises:
  (a) precipitating an aqueous solution of one or more aluminum salt(s) in the presence of a phosphorus-containing compound by adjusting the pH of said solution to a range between about 5.5 and about 10.0 at a temperature in the range between about 20° C. and about 90° C.,
  (b) aging the precipitate at a temperature ranging from about 20° C. to about 90° C. for at least about 15 minutes at a pH ranging from about 8.0 to about 12.0,
  (c) washing the precipitate,
  (d) mixing a dry, water-soluble salt of a heavy metal selected from the group consisting of molybdenum, tungsten and mixtures thereof, and a mixture of a dry, water-soluble cobalt salt and a phosphorus-containing compound with the precipitate at a pH in the range between about 4.0 and about 10.0 and a temperature in the range between about 25° C. and about 100° C. to yield a final catalyst having from about 1% w to about 5% w cobalt and from about 8% w to about 32% w heavy metal,
  (e) extruding the product of step (d), and
  (f) drying and calcining the product of step (e) at a temperature ranging from about 300° C. to about 900° C.

42. The process of claim 41 wherein the precipitation is carried out at a pH in the range between about 5.5 and about 8.0.

43. The process of claim 41 wherein the precipitation is carried out at a temperature between about 50° C. and about 85° C.

44. The process of claim 41 wherein the amount of phosphorus-containing compound in step (a) is from about 0.06 to about 0.30 moles of phosphorus per mole of aluminum.

45. The process of claim 41 wherein the aging pH is in the range between about 9.0 and about 11.0.

46. The process of claim 41 wherein step (d) is carried out at a pH in the range between about 4.0 and about 6.0.

47. The process of claim 41 wherein said salts in step (d) are salts of cobalt and molybdenum.

48. The process of claim 47 wherein the amount of phosphorus-containing compound in step (d) is from about 0.2 to about 1.5 moles of phosphorus per mole of molybdenum.

49. The process of claim 47 wherein said catalyst contains from about 2.5% w to about 4% w cobalt and from about 8% w to about 18% w molybdenum.

50. The process of claim 41 wherein the amount of phosphorus-containing compound in step (d) is from about 0.2 to about 1.5 moles of phosphorus per mole of heavy metal.

51. A process for preparing highly active hydrotreating catalysts having surface areas above about 300 m²/g and at least about 80% of the pore volume in pores having diameters less than about 70 Å, which process comprises:
   (a) titrating an aqueous solution of an acid aluminum salt and an aqueous solution of a basic aluminum compound in the presence of a phosphorus-containing compound at a pH in the range between about 5.5 and about 10.0 and a temperature in the range between about 20° C. and about 90° C., thereby forming a precipitate,
   (b) aging the precipitate at a temperature ranging from about 20° C. to about 90° C. for at least about 15 minutes at a pH ranging from about 8.0 to about 12.0,
   (c) washing the precipitate,
   (d) mixing a dry, water-soluble metal salt of a heavy metal selected from the group consisting of molybdenum, tungsten and mixtures thereof, and a mixture of a dry, water-soluble cobalt salt and a phosphorus-containing compound with the precipitate at a pH in the range between about 4.0 and about 10.0 and a temperature in the range between about 25° C. and about 100° C. to yield a final catalyst having from about 1% w to about 5% w cobalt and from about 8% w to about 32% w heavy metal,
   (e) extruding the product of step (d), and
   (f) drying and calcining the product of step (e) at a temperature ranging from about 300° C. to about 900° C.

52. The process of claim 51 wherein the precipitation is carried out at a pH in the range between about 5.5 and about 8.0.

53. The process of claim 51 wherein the precipitation is carried out at a temperature between about 50° C. and about 85° C.

54. The process of claim 51 wherein the amount of phosphorus-containing compound in step (a) is from about 0.06 to about 0.30 moles of phosphorus per mole of aluminum.

55. The process of claim 51 wherein the aging pH is in the range between about 9.0 and about 11.0.

56. The process of claim 51 wherein step (d) is carried out at a pH in the range between about 4.0 and about 6.0.

57. The process of claim 51 wherein said salts in step (d) are salts of cobalt and molybdenum.

58. The process of claim 57 wherein the amount of phosphorus-containing compound in step (d) is from about 0.2 to about 1.5 moles of phosphorus per mole of molybdenum.

59. The process of claim 57 wherein said catalyst contains from about 2.5% w to about 4% w cobalt and from about 8% w to about 18% w molybdenum.

60. The process of claim 51 wherein the amount of phosphorus-containing compound in step (d) is from 0.2 to about 1.5 moles of phosphorus per mole of heavy metal.

61. A process for preparing highly active hydrotreating catalysts having surface areas above about 300 m²/g and at least about 80% of the pore volume in pores having diameters less than about 70 Å, which process comprises:
   (a) titrating an aqueous solution of an acid aluminum salt and phosphoric acid with an aqueous solution of a basic aluminum compound at a pH in the range between about 5.5 and about 10.0 and a temperature in the range between about 20° C. and about 90° C., thereby forming a precipitate,
   (b) aging the precipitate at a temperature ranging from about 20° C. to about 90° C. for at least about 15 minutes at a pH ranging from about 8.0 to about 12.0,
   (c) washing the precipitate,
   (d) mixing a dry, water-soluble salt of a heavy metal selected from the group consisting of molybdenum, tungsten and mixtures thereof, and a mixture of a dry, water-soluble cobalt salt and a phosphorus-containing compound with the precipitate at a pH in the range between about 4.0 and about 10.0 and a temperature in the range between about 25° C. and about 100° C. to yield a final catalyst having from about 1% w to about 5% w cobalt and from about 8% w to about 32% w heavy metal,
   (e) extruding the product of step (d), and
   (f) drying and calcining the product of step (e) at a temperature ranging from about 300° C. to about 900° C.

62. The process of claim 61 wherein the precipitation is carried out at a pH in the range between about 5.5 and about 8.0.

63. The process of claim 61 wherein the precipitation is carried out at a temperature between about 50° C. and about 85° C.

64. The process of claim 61 wherein the amount of phosphoric acid in step (a) is from about 0.06 to about 0.30 moles of phosphorus per mole of aluminum.

65. The process of claim 61 wherein the aging pH is in the range between about 9.0 and about 11.0.

66. The process of claim 61 wherein step (d) is carried out at a pH in the range between about 4.0 and about 6.0.

67. The process of claim 61 wherein said salts in step (d) are salts of cobalt and molybdenum.

68. The process of claim 67 wherein the amount of phosphorus-containing compound in step (d) is from about 0.2 to about 1.5 moles of phosphorus per mole of molybdenum.

69. The process of claim 67 wherein said catalyst contains from about 2.5% w to about 4% w cobalt and from about 8% w to about 18% w molybdenum.

70. The process of claim 61 wherein the amount of phosphorus-containing compound in step (d) is from about 0.2 to about 1.5 moles of phosphorus per mole of heavy metal.

71. The process for preparing highly active hydrotreating catalysts having surface areas above about 300 m²/g and at least about 80% of the pore volume in pore housing diameters less than about 70 Å, which process comprises:
   (a) titrating an aqueous solution of an acid aluminum salt with an aqueous solution of a basic aluminum compound and sodium phosphate at a pH in the range between about 5.5 and about 10.0 and a temperature in the range between about 20° C. and about 90° C., thereby forming a precipitate,
   (b) aging the precipitate at a temperature ranging from about 20° C. to about 90° C. for at least about 15 minutes at a pH ranging from about 8.0 to about 12.0,
   (c) washing the precipitate, (d) mixing a dry, water-soluble salt of a heavy metal selected from the group consisting of molybdenum, tungsten and mixtures thereof, and a mixture of a dry, water-soluble cobalt salt and a phosphorus-containing compound with the precipitate at a pH in the range between about 4.0 and about 10.0 and a temperature in the range between about 25° C. and about 100° C. to yield a final catalyst having from about 1% w to about 5% w cobalt and from about 8% w to about 32% w heavy metal, (e) extruding the product of step (d), and (f) drying and calcining the product of step (e) at a temperature ranging from about 300° C. to about 900° C.

72. The process of claim 71 wherein the precipitation is carried out at a pH in the range between about 5.5 and about 8.0.

73. The process of claim 71 wherein the precipitation is carried out at a temperature between about 50° C. and about 85° C.

74. The process of claim 71 wherein the amount of sodium phosphate in step (a) is from about 0.06 to about 0.30 moles of phosphorus per mole of aluminum.

75. The process of claim 71 wherein the aging pH is in the range between about 9.0 and about 11.0.

76. The process of claim 71 wherein step (d) is carried out at a pH in the range between 4.0 and 6.0.

77. The process of claim 71 wherein said salts in step (d) are salts of cobalt and molybdenum.

78. The process of claim 77 wherein the amount of phosphorus-containing compound in step (d) is from about 0.2 to about 1.5 moles of phosphorus per mole of molybdenum.

79. The process of claim 77 wherein said catalyst contains from about 2.5% w to about 4% w cobalt and from about 8% w to about 18% w molybdenum.

80. The process of claim 71 wherein the amount of phosphorus-containing compound in step (d) is from about 0.2 to about 1.5 moles of phosphorus per mole of heavy metal.

81. A process for preparing highly active hydrotreating catalysts having surface areas above about 300 $m^2/g$ and at least about 80% of the pore volume in pores housing diameters less than about 70 Å, which process comprises;

(a) titrating an aqueous solution of an acid aluminum salt selected from the group consisting of aluminum sulfate, aluminum nitrate and aluminum chloride, and an aqueous solution of a basic aluminum compound selected from the group consisting of sodium aluminate and potassium aluminate, in the presence of a phorphorus-containing compound at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble cobalt salts and molybdate or dimolybdate salts at a pH in the range between about 4.0 and about 6.0 and a temperature in the range between about 25° C. and about 100° C. to yield a final catalyst having from about 2.5% w to about 4% w cobalt and from about 10% w to about 14% w molybdenum, (e) extruding the product of step (d), and (f) drying and calcining the product of step (e) at a temperature ranging from about 300° C. to about 900° C.

82. A process for preparing highly active hydrotreating catalysts having surface areas above about 300 $m^2/g$ and at least about 80% of the pore volume in pores having diameters less than about 70 Å, which process comprises:

(a) titrating an aqueous solution of an acid aluminum salt selected from the group consisting of aluminum sulfate, aluminum nitrate and aluminum chloride, and an aqueous solution of a basic aluminum compound selected from the group consisting of sodium aluminate and potassium aluminate in the presence of a phosphorus-containing compound at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble cobalt salts and molybdate or dimolybdate salts, and phosphoric acid in an amount of from about 0.2 to about 1.5 moles of phosphorus per mole of molybdenum, at a pH in the range between about 4.0 and about 6.0 and a temperature in the range between about 25° C. and about 100° C. to yield a final catalyst having from about 2.5% w to about 4% w cobalt and from about 10% w to about 14% w molybdenum, (e) extruding the product of step (d), and (f) drying and calcining the product of step (e) at a temperature ranging from about 300° C. to about 900° C.

83. A process for preparing highly active hydrotreating catalysts having surface areas above about 300 $m^2/g$ and at least about 80% of the pore volume in pores having diameters less than about 70 Å, which process comprises;

(a) precipitating an aqueous solution of an acid aluminum salt selected from the group consisting of aluminum sulfate, aluminum nitrate and aluminum chloride, with an aqueous solution of a base in the presence of a phorphorus-containing compound at a pH in the range between about 5.5 and about 8.0 and a temperature in the range between about 20° C. and about 90° C., (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble cobalt salts and molybdate or dimolybdate salts at a pH in the range between about 4.0 and about 6.0 and a temperature in the range between about 25° C. and about 100° C. to yield a final catalyst having from about 2.5% w to about 4% w cobalt and from about 10% w to about 14% w molybdenum, (e) extruding the product of step (d), and (f) drying and calcining the product of step (e) at a temperature ranging from about 300° C. to about 900° C.

84. A process for preparing highly active hydrotreating catalysts having surface areas above about 300 $m^2/g$ and at least about 80% of the pore volume in pores having diameters less than about 70 Å, which process comprises;
(a) precipitating an aqueous solution of an acid with an aqueous solution of a basic aluminum compound selected from the group consisting of sodium aluminate and potassium aluminate, in the presence of a phorphorus-containing compound at a pH in the range between about 5.5 and about 8.0 and a temperature in the range between about 20° C. and about 90° C.,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with dry, water-soluble cobalt salts and molybdate or dimolybdate salts at a pH in the range between about 4.0 and about 6.0 and a temperature in the range between about 25° C. and about 100° C. to yield a final catalyst having from about 2.5% w to about 4% w cobalt and from about 10% w to about 14% w molybdenum,
(e) extruding the product of step (d), and
(f) drying and calcining the product of step (e) at a temperature ranging from about 300° C. to about 900° C.

85. A process for preparing highly active hydrotreating catalysts having surface areas above about 300 m²/g and at least about 80% of the pore volume in pores having diameters less than about 70 Å, which process comprises:
(a) precipitating an aqueous solution of an acid aluminum salt selected from the group consisting of aluminum sulfate, aluminum nitrate and aluminum chloride, with an aqueous solution of a base in the presence of a phosphorus-containing compound at a pH in the range between about 5.5 and about 8.0 and a temperature in the range between about 20° C. and about 90° C.,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with dry, water-soluble cobalt salts and molybdate or dimolybdate salts, and phosphoric acid in an amount of from about 0.2 to about 1.5 moles of phosphorus per mole of molybdenum, at a pH in the range between about 4.0 and about 6.0 and a temperature in the range between about 25° C. and about 100° C. to yield a final catalyst having from about 2.5% w to about 4% w cobalt and from about 10% w to about 14% w molybdenum,
(e) extruding the product of step (d), and
(f) drying and calcining the product of step (e) at a temperature ranging from about 300° C. to about 900° C.

86. A process for preparing highly active hydrotreating catalysts having surface areas above about 300 m²/g and at least about 80% of the pore volume in pores having diameters less than about 70 Å, which process comprises:
(a) precipitating an aqueous solution of an acid with an aqueous solution of a basic aluminum compound selected from the group consisting of sodium aluminate and potassium aluminate, in the presence of a phosphorus-containing compound at a pH in the range between about 5.5 and about 8.0 and a temperature in the range between about 20° C. and about 90° C.,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with dry, water-soluble cobalt salts and molybdate or dimolybdate salts, and phosphoric acid in an amount of from about 0.2 to about 1.5 moles of phosphorus per mole of molybdenum, at a pH in the range between about 4.0 and about 6.0 and a temperature in the range between about 25° C. and about 100° C. to yield a final catalyst having from about 2.5% w to about 4% w cobalt and from about 10% w to about 14% w molybdenum,
(e) extruding the product of step (d), and
(f) drying and calcining the product of step (e) at a temperture ranging from about 300° C. to about 900° C.

* * * * *